United States Patent [19]

Meyer et al.

[11] 4,424,289

[45] Jan. 3, 1984

[54] CONTINUOUS PROCESS FOR THE MANUFACTURE OF QUICK-SETTING PHENOLIC FOAMS

[75] Inventors: Nicolas Meyer, Bully les Mines; Gilbert Wollaert, Lens, both of France

[73] Assignee: Société Chimique des Charbonnages SA, Paris, France

[21] Appl. No.: 378,369

[22] Filed: May 14, 1982

[30] Foreign Application Priority Data

May 15, 1981 [FR] France ................................ 81 09685

[51] Int. Cl.$^3$ .............................................. C08J 9/14
[52] U.S. Cl. ................................... 521/103; 521/121; 521/181
[58] Field of Search ........................ 521/103, 121, 181

[56] References Cited

U.S. PATENT DOCUMENTS

| | | | |
|---|---|---|---|
| 3,741,920 | 6/1973 | Weissenfels et al. | 521/181 |
| 3,821,337 | 6/1974 | Bunclark | 521/181 |
| 4,043,950 | 8/1977 | Wilmsen . | |
| 4,102,832 | 7/1978 | Weissenfels et al. | 521/181 |
| 4,123,414 | 10/1978 | Milette . | |
| 4,166,162 | 8/1979 | Weissenfels et al. | 521/181 |
| 4,207,400 | 6/1980 | Dahms | 521/181 |
| 4,207,401 | 6/1980 | Dahms | 521/181 |
| 4,216,295 | 8/1980 | Dahms | 521/181 |
| 4,272,403 | 6/1981 | Meyer et al. . | |
| 4,303,758 | 12/1981 | Gusmer | 521/181 |
| 4,323,667 | 4/1982 | Meyer et al. . | |

FOREIGN PATENT DOCUMENTS

| | | |
|---|---|---|
| 2016760 | 5/1970 | France . |
| 2205553 | 5/1974 | France . |
| 2234336 | 1/1975 | France . |
| 2246596 | 5/1975 | France . |
| 2426559 | 12/1979 | France . |
| 1088057 | 10/1967 | United Kingdom . |

*Primary Examiner*—Morton Foelak
*Attorney, Agent, or Firm*—Millen & White

[57] ABSTRACT

A continuous process for manufacturing quick-setting phenolic foams is improved by using as the hardening agent a concentrated, substantially anhydrous solution of boron trioxide, and using as the blowing agent an organic liquid having a boiling point of 20°–80° C. Curing times are shortened and the resultant foam, having uniformly molecularly dispersed therein about 0.25–10.5% by weight of boron, calculated as boric anhydride, has substantially uniform cells, improved fire resistance characteristics and superior mechanical properties.

9 Claims, No Drawings

CONTINUOUS PROCESS FOR THE MANUFACTURE OF QUICK-SETTING PHENOLIC FOAMS

BACKGROUND OF THE INVENTION

The present invention relates to a continuous process for the manufacture of quick-setting phenolic foams and relates more particularly to a continuous process for the manufacture of quick-setting phenolic foams having superior mechanical characteristics, cell uniformity and fire-resistance properties and to the products produced thereby.

Phenolic foams based on phenolic resins have been known for a long time. Phenolic resins are precondensates or resols resulting from the limited reaction of a phenol and an aldehyde, in particular formaldehyde, in the presence of an alkaline catalyst. To obtain phenolic foams, a blowing agent consisting of a product such as an organic liquid with a low boiling point, or an inorganic salt which releases gases under the action of an acid, is added to the resols, which optionally contain a surface-active agent, and the mixture is subjected to the catalytic action of an acid in order to effect the hardening of the expanded mixture. Since phenolic foams are used in particular for insulation, it is appropriate to have available materials which have improved fire-resistance characteristics. For this purpose, it has been proposed to add products which are known to improve the fire-resistance properties.

It is known that the manufacture of phenolic foams is carried out either by a batch process in open or closed molds, or by a continuous process in which all the ingredients required for the manufacture of the foam are distributed between the belts of, e.g., a twin-belt press. To be able to manufacture industrially, by a continuous process, phenolic foams which have at the same time superior mechanical properties and improved fire-resistance characteristics, it has been proposed to use additives which are capable both of accelerating the foaming and the hardening and of improving the fire-resistance properties of the foams obtained. In particular, it has been proposed to add boron trioxide in a solid form, namely in the form of particles, grains or powders of a greater or lesser degree of fineness. Unfortunately, boron trioxide added in this form disperses poorly, causes a deterioration of the mechanical properties and thus leads to only average and non-uniform fire-resistance properties.

A need therefore continues to exist for a continuous process for manufacturing phenolic foams which avoids the foregoing disadvantages.

OBJECTS OF THE INVENTION

Accordingly, one object of the present invention is to provide a continuous process for manufacturing phenolic foams having substantially uniform cells, improved fire-resistance characteristics and superior mechanical properties.

Another object of the present invention is to reduce the curing time for phenolic foams produced by a continuous process.

Still another object is to provide novel and superior phenolic foam articles of manufacture.

Upon further study of the specification and appended claims, further objects and advantages of this invention will become apparent to those skilled in the art.

SUMMARY OF THE INVENTION

These and other objects of the invention are achieved by providing, in a continuous process for manufacturing a phenolic foam, comprising mixing a liquid phenolic resol, a blowing agent and a hardener; continuously depositing the resultant mixture on a belt; continuously expanding and hardening the mixture to form a phenolic foam; and recovering the resulting foam, the improvement wherein said blowing agent is an organic liquid having a boiling point of 20°–80° C.; and said hardener is a concentrated, substantially anhydrous boric anhydride solution comprising at least 5% by weight of boric anhydride; an organic solvent, said solvent being a monoalcohol, a polyalcohol, a trialkylborate, a dialkyl acetal of formaldehyde or a mixture thereof; and 5–70% by weight, based on the weight of hardener solution, of concentrated sulfuric acid, an aromatic sulfonic acid or a mixture thereof. A quick-setting foam is obtained within a significantly shorter curing time.

In a composition of matter aspect, the invention provides a phenolic foam having uniformly molecularly dispersed therein about 0.25–10.5% by weight of boron, calculated as boric anhydride, and having substantially uniform cells, improved fire-resistance and superior mechanical properties.

DETAILED DISCUSSION

It has now been found that carrying out the expansion with the aid of organic solvents with a low boiling point, and the hardening with the aid of a particular boron-containing acid catalyst, makes it possible to obtain foams with substantially uniform cells, which have improved fire-resistance characteristics while retaining superior mechanical properties. Furthermore, the use of this type of blowing agent together with this type of hardener is especially suitable for the manufacture of quick-setting foams by a continuous process. Surprisingly and unexpectedly, the process of the present invention makes it possible to significantly reduce the curing time for such foams, often by at least half, compared to processes using conventional hardeners. By curing time is meant the time necessary for expanding and hardening the foam in the continuous process, i.e., the residence time of the resin between the heated belts.

The liquid blowing agents which are suitable for carrying out the process of the invention are organic liquids which have a boiling point of 20°–80° C., and which are chemically inert to the other components of the resol mixture. Suitable such liquids include n-pentane, petroleum fractions boiling between 25° and 70° C., chlorofluoromethanes, chlorofluoroethanes or mixtures thereof. Various chlorofluoromethanes and chlorofluoroethanes are marketed under the trademark "Freons" by Dupont. Boiling points of these compounds and of hydrocarbons boiling in the range 25°–70° C. are shown in Table I.

The blowing agent is used in an amount of 1–15% preferably 5–10% by weight, relative to the resol resin. Use of such blowing agents with a conventional hardener is disclosed in British Patent No. 1,088,057 which is incorporated herein by reference.

TABLE I

| Blowing Agent | Boiling point (°C.) |
|---|---|
| n-Pentane | 36.1 |

TABLE I-continued

| Blowing Agent | Boiling point (°C.) |
|---|---|
| 2-Methylbutane | 27.8 |
| n-Hexane | 68.7 |
| 2-Methylpentane | 60.2 |
| 3-Methylpentane | 63.3 |
| 2,3-Dimethylbutane | 58.0 |
| 2,2-Dimethylbutane | 49.7 |
| Dichloromethane | 40.0 |
| Trichloromethane | 61.2 |
| Trichlorofluoromethane | 23.8 |
| Trichlorotrifluoroethane | 47.6 |
| Dichlorotrifluoroethane | 28.2 |
| Dichlorodifluoroethane | 46.8 |

Concentrated, substantially anhydrous boric anhydride solutions suitable for use as the hardener in the present process are described in U.S. Pat. Nos. 4,272,403 and 4,323,667, the disclosures of which are incorporated herein by reference. Such a solution contains (A) at least 5% by weight of boric anhydride (boron trioxide); (B) one or more organic solvents selected from monohydric or polyhydric alcohols, trialkyl borates and formaldehyde dialkyl actals; and (C) 5-70% by weight, relative to the weight of hardener solution, of concentrated sulfuric acid, an aromatic sulfonic acid or a mixture thereof. Preferably, these solutions contain 10-35% by weight of boron trioxide, 15-50% by weight of acid and 30-60% by weight of organic solvent.

According to the invention, these solutions are generally used in amounts of 5-30%, preferably 10-25% by weight, relative to the resol. The resultant foam has uniformly molecularly dispersed therein about 0.25-10.5% by weight of boron, calculated as boric anhydride. By using an amount greater than 30% the setting is too fast, by using an amount inferior to 5%, the setting of the foam is too slow.

The process for the manufacture of phenolic foams is carried out in a known manner starting from conventional phenolic resol resins, which are prepared by condensing formaldehyde with phenol in the presence of an alkaline catalyst, and then distilling the water in vacuo until the solids content is between 60 and 85%. Conventional additives, such as plasticisers and surface-active agents, in particular polyoxyethyleneated long-chain fatty acid monoesters of sorbitol (marketed under the trademark "Tweens" by Atlas Chemical Co.), oxyethyleneated castor oil and silicone oils, are incorporated into the resulting liquid phenolic resol resins. These surface-active agents are added in amounts of 0.4-10% by weight, preferably 1-5% by weight, relative to the phenolic resin. In a known manner, it is also possible to add resorcinol to the phenolic resin, and this permits a further slight acceleration of the hardening rates.

The process of the present application is easy to carry out. For example, it can be effected by mixing the various ingredients required for the manufacture of the foam in a mixer feeding a twin-belt conveyor. The mixture is then continuously deposited on the conveyor, on which support sheets are preferably arranged. Depending on the composition of the expandable mixture, the operation is carried out at temperatures of 10°-100° C., preferably 20°-80° C. The conveyor can be heated, e.g., by means of an oven in which the conveyor is located.

It is self-evident that the present process can be adapted to a batch technique for the manufacture of phenolic foams, because the problems of the setting time of the foams are less acute than in a continuous process. It is therefore also possible to manufacture foams having superior mechanical properties together with improved fire-resistance characteristics using a batch process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Crush strengths are determined according to French Standard Specification T 56.101. The oxygen index is determined according to French Standard Specification T 51.071. A high oxygen index denotes a material which is not easily consumed, i.e., a material having improved fire-resistance characteristics.

EXAMPLE 1

100 parts by weight of a resol obtained by condensing formaldehyde and phenol in a molar ratio formaldehyde/phenol = 1.5, in an alkaline medium, and having a viscosity of 10 poises at 20° C., are introduced into a mixer feeding a twin-belt conveyor. 2 parts by weight of the surface-active agent TWEEN 60 (Atlas), and then 7 parts by weight of Freon 113 blowing agent (trichlorotrifluoroethane) are added to the resin. Then, 20 parts of a boron trioxide hardener solution having the composition:

43.6 parts of trimethyl borate,
18.2 parts of para-toluenesulfonic acid,
18.2 parts of boron trioxide, and
20 parts of concentrated sulfuric acid (98%)
are added to the mixture.

The resultant mixture is continuously deposited on a twin-belt conveyor heated to 65° C. by means of an oven. After a curing time of 10 minutes, a foam is obtained which has the following characteristics:
density: 29 kg/m$^3$
crush strength: 230 kg - Pascals
oxygen index: 49.5.

COMPARATIVE EXAMPLE 2

Example 1 is repeated, except that the boron trioxide hardener solution is replaced by 15 parts of a conventional hardener consisting of a mixture of 22.2 parts of para-toluenesulfonic acid and 44.4 parts of phenolsulfonic acid and 33.3 parts of water.

The curing time of the resultant foam is 20 minutes. The foam obtained has the following characteristics:
density: 39 kg/m$^3$
crush strength: 184 kg - Pascals
oxygen index: 33.

EXAMPLES 3 AND 4

Example 1 is repeated except that the composition of the boron-containing hardener solution is modified as shown in the following table. The table also shows the curing times of the resultant foams and the characteristics of the products obtained.

| | EXAMPLE | |
|---|---|---|
| | 3 | 4 |
| Hardener (parts by weight) | | |

-continued

| | EXAMPLE | |
|---|---|---|
| | 3 | 4 |
| Trimethyl borate | 40.8 | 38.4 |
| Para-toluenesulfonic acid | 17.1 | 16.1 |
| Boron trioxide | 17.1 | 16.1 |
| Sulfuric acid (98%) | 25 | 29.4 |
| Curing time (minutes) | 8 | 6 |
| Density (kg/m$^3$) | 45 | 48 |
| Crush strength (kg - Pascals) | 235 | 280 |
| Oxygen index | 41 | 37 |

EXAMPLE 5

This example illustrates the adaptation of the process of the invention to a conventional technique for the manufacture of phenolic foams by a batch process. 100 parts by weight of the resol used in Example 1 are introduced into a cubic mold having edge lengths of 600 mm. Then, 20 parts of a boron trioxide hardener solution having the composition:
45.4 parts of trimethyl borate,
27.3 parts of para-toluenesulfonic acid, and
27.3 parts of boron trioxide
are added to this mixture.

The mold is kept in an oven at 60° C., which permits expansion of the mixture in 25 minutes. The expanded block is cured for 1.5 hours. After mold release, a block with fine and uniform cells is obtained which has the following characteristics:
density: 38 kg/m$^3$
crush strength: 122 kg - Pascals
oxygen index: 49.5.

COMPARATIVE EXAMPLE 6

Example 2 is repeated using the same conventional hardener, to which 4.5 parts of powdered boron trioxide have been added. After treatment as in Example 2, a foam is obtained which has the following characteristics:
density: 55 kg/m$^3$
crush strength: 197 kg - Pascals
oxygen index: variable between 31 and 47, depending on the test-pieces.

The non-uniformity of the oxygen index of the test-pieces provides a clear illustration of the poor dispersion of the boron trioxide when it is added in powder form.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a continuous process for manufacturing a phenolic foam, comprising mixing a liquid phenolic resol, a blowing agent and a hardener; continuously depositing the resultant mixture on a belt; continuously expanding and hardening the mixture to form a phenolic foam; and recovering the resultant foam,
the improvement wherein said blowing agent is an organic liquid having a boiling point of 20°-80° C.; and said hardener is a concentrated, substantially anhydrous boric anhydride solution comprising: (A) at least 5% by weight of boric anhydride; (B) an organic solvent, said solvent being a monoalcohol, a polyalcohol, a trialkylborate, a dialkyl acetal of formaldehyde or a mixture thereof; and (C) 5-70% by weight, based on the weight of hardener solution, of concentrated sulfuric acid, an aromatic sulfonic acid or a mixture thereof.

2. A process according to claim 1, wherein said blowing agent is n-pentane, a petroleum fraction having a boiling point of 25°-70° C., a chlorofluoromethane, a chlorofluoroethane or a mixture thereof.

3. A process according to claim 1, wherein the amount of said blowing agent is 1-15% by weight relative to said resol.

4. A process according to claim 3, wherein said amount of blowing agent is 5-10% by weight.

5. A process according to claim 1, wherein said hardener solution comprises 10-35% by weight of boric anhydride; 15-50% by weight of acid; and 30-60% by weight of organic solvent.

6. A process according to claim 1, wherein the amount of said hardener solution is 5-30% by weight relative to said resol.

7. A process according to claim 4, wherein the amount of said hardener solution is 10-25% by weight.

8. A process according to claim 1, wherein the resol mixture is expanded and hardened at a temperature of 10°-100° C.

9. A process according to claim 8, wherein said temperature is 20°-80° C.

* * * * *